United States Patent [19]
Irisawa

[11] 3,779,563

[45] Dec. 18, 1973

[54] DEVICE FOR ERASING INSIDE FORCE OF PICKUP ARM OF RECORD PLAYER

[76] Inventor: Kiyosi Irisawa, 11-30 Nakanole 1-chome, Shinagawa-shi, Tokyo, Japan

[22] Filed: May 24, 1972

[21] Appl. No.: 256,400

[52] U.S. Cl. .................... 274/23 R

[51] Int. Cl. .................... G11b 3/12

[58] Field of Search .................... 274/23 R

[56] References Cited

UNITED STATES PATENTS 3,292,935 12/1966 Cooper .................... 274/23 R

*Primary Examiner*—Louis R. Prince
*Assistant Examiner*—Charles E. Phillips
*Attorney*—John J. Mc Glew et al.

[57] ABSTRACT

The device comprises a pair of ring-shaped magnets each of which is magnetized on one side only so that the N and S poles are formed in diametrically opposed relation on the magnetized side. The ring-shaped magnets are mounted on a pickup arm supporting shaft in such a manner that their magnetized faces are opposed to each other, with one of the magnets being arranged slidable on the shaft to enable to adjust the distance between the two opposed magnets and the other magnet being arranged rotatable at its fixed position on the supporting shaft along with the pickup, arm so that the pickup arm operates in a manner such that it is given an attractive or repulsive force of the magnets in a direction opposite to the inside force such that the curve of variation of the turning force caused by displacement of the magnetic poles will substantially coincide with the inside force variation curve.

9 Claims, 9 Drawing Figures

FIG. 5
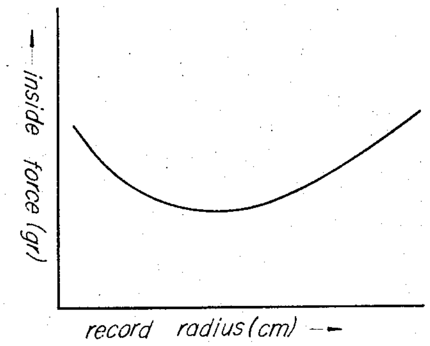
FIG. 7
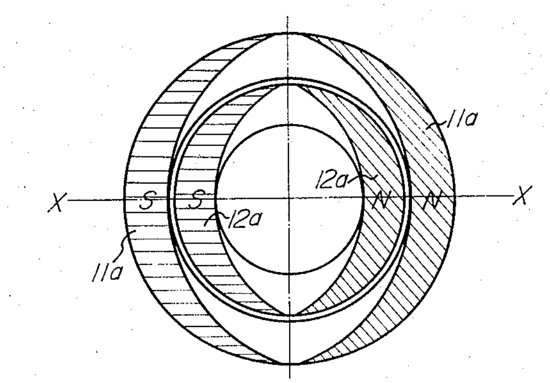
FIG. 6
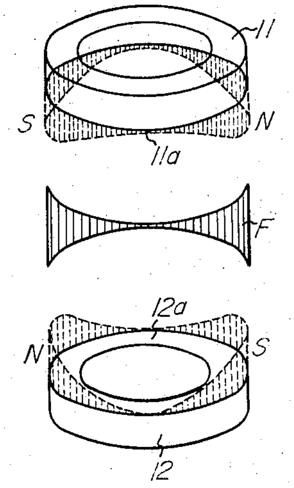
FIG. 8
FIG. 9
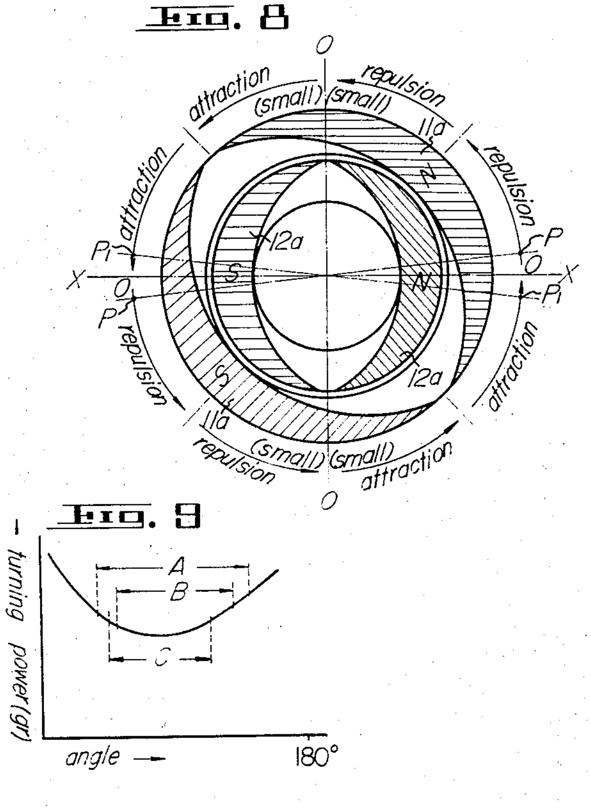

DEVICE FOR ERASING INSIDE FORCE OF PICKUP ARM OF RECORD PLAYER

TECHNICAL BACKGROUND OF THE INVENTION

In general, when a record is played, there is always produced a component force working to urge the head of the pickup arm to move toward the center of the record due to the contact between the needle end and the sound groove surface. Such component force is generally called the "inside force" of the head of the pickup arm which, if not counteracted during the playing operation, may badly impair the ideal reproduction of the recorded sounds.

Such inside force is produced infallibly during the play of a record unless the tracking angle is zero. Usually, such force is large at the inner periphery of record disc and smallest at the middle part thereof. At the outer periphery of disc, the force is enlarged gradually with the increase of the disc radius. It is also observed to be varied in accordance with the variation of the tracking angle and if diagrammatized, it describes generally a parabolic variation curve as shown in FIG. 5.

Therefore, in order to counteract or cancel out such inside force, it is necessary to impart to the pickup arm a turning point in a direction opposed to the inside force by providing the arm with a turning force of a nature that describes a variation curve closely analoguous to the above-mentioned inside force curve. For this end, various technical means and methods, utilizing springs, weights, levers, permanent magnets or the like, for example, have been proposed in the past, but all of these proposals are far from the ideal.

SUMMARY OF THE INVENTION

The present invention is directed to providing a device for counteracting such inside force most effectively. For this end, the invention utilizes a pair of ring-shaped magnets each of which is magnetized to form the N and S poles in diametrically opposed relation on one side alone, both magnets being fitted on a pickup arm turning and supporting shaft in such a manner that they are vertically opposed to each other, one of the magnets being arranged vertically movable on the shaft, but rotatable therewith, to allow adjustment of the distance between the two magnets, the other magnet being arranged rotatable singly or with the pickup arm, either clockwise or counterclockwise as desired, but fixed against axial or vertical movement. Thus, when the pickup arm is placed on a disc (29), after suitably adjusting the distance between the upper and lower magnets, and with both magnets being kept stationary, relative to their respective support components there is produced an angular displacement between the poles of the magnet which turns with the pickup arm and the poles of the magnet which remains fixed against rotation owing to movement of the poles of the angularly displaceable magnet, and such displacement accordingly causes an increase or decrease of the repulsive and attractive forces of the magnets. The present invention takes advantage of such fact. Namely, according to the present invention, such forces are utilized to produce a turning power or torque working in a direction opposed to the inside force, with such turning power being transmitted to the pickup arm via its supporting shaft located axially of the magnets, thereby to cancel the inside force.

It is accordingly a primary object of the present invention to counteract the inside force just mentioned by utilizing a pair of ring-shaped magnets disposed with their different poles opposed to each other on a turning and supporting shaft of the pickup arm, such that the repulsive and attractive forces of said magnets are varied in such a manner as to describe a curve closely conformant to the inside force variation curve.

It is another object of the present invention to effect such cancellation of the inside force with members of small volumes by utilizing a pair of ring-shaped magnets that can be fitted on an extremely small portion of the pickup arm turning shaft.

It is still another object of the present invention to make it possible to adjust, with ease, the distance between the relative opposed positions of a pair of ring-shaped magnets mounted on the pickup arm turning shaft, so as to allow an easy and positive inside force cancelling operation.

It is also a subordinate object of the present invention to provide a pair of ring-shaped magnets and other associated members attached to the pickup arm turning shaft, the magnets and members being simple in construction and available at low cost.

A further subordinate object of the present invention is to provide a pair of ring-shaped magnets to be mounted on the pickup arm turning shaft, the magnets being of a size that can be housed in a small space and can maintain good external apperance of the entire pickup assembly.

BRIEF DESCRIPTION OF THE DRAWINGS

FIG. 5 is a graph showing the inside force variation curve;

FIG. 6 is an illustrative sketch showing the pattern of magnetic flux formed by the upper and lower magnets;

FIG. 7 is a top plan view of the magnetic flux formed by the two opposed ring-shaped magnets;

FIG. 8 is an illustration showing the manner of variation of the magnetic forces in a situation where one of the opposed ring-shaped magnets is kept stationary while the other is being displaced; and FIG. 9 is a graph showing the curve of variation of the turning force produced by displacement of the movable ring-shaped magnet.

DETAILED DESCRIPTION OF THE INVENTION

Figure 1:
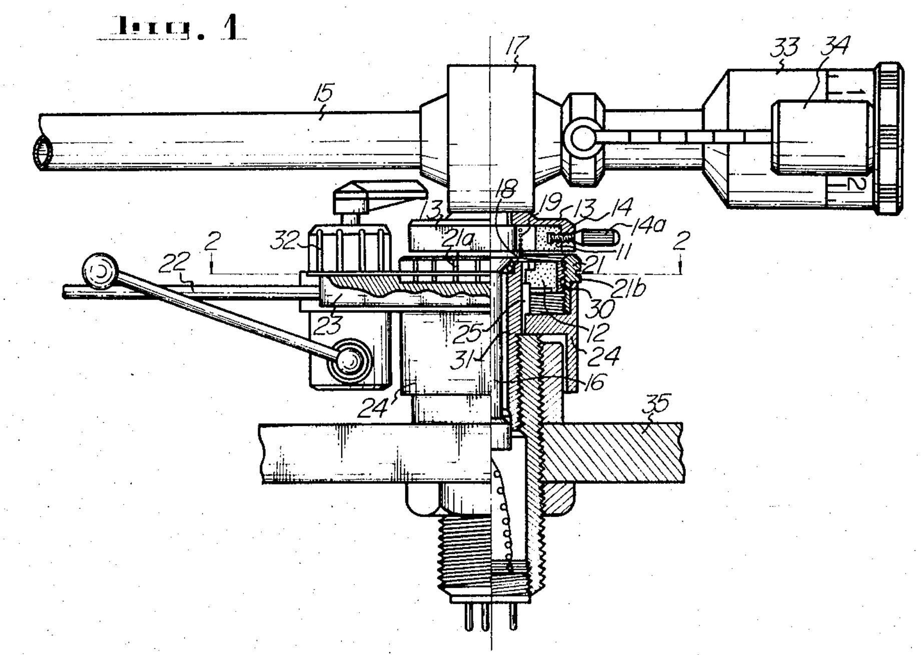
FIG. 1 is a partial side view of the pickup arm assembly, with the essential parts of the pickup arm turning shaft mechanism being shown in section.
Figure 2:
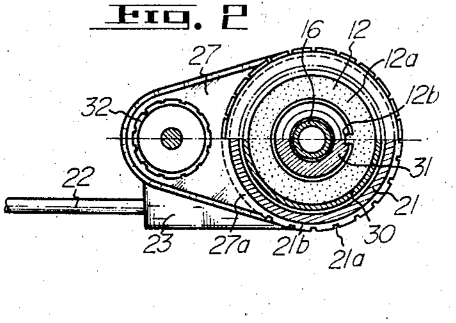
FIG. 2 is a sectional view taken along the line 2—2 of FIG. 1.
Figure 3:
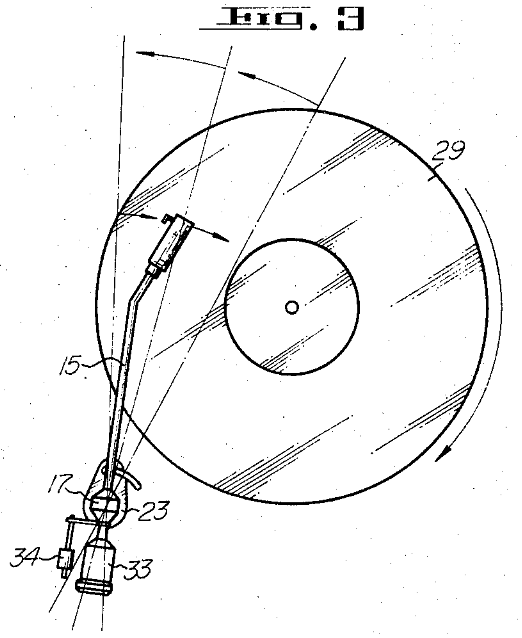
FIG. 3 is a top plan view of the pickup arm placed on a disc, illustrating the acting pattern of the inside force.
Figure 4:
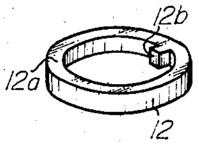
FIG. 4 is a perspective view of the lower ring-shaped magnet.

The characteristic mechanism of the present invention will now be described in detail by way of an embodiment thereof with reference to the accompanying drawings.

It will be seen that the upper ring-shaped magnet 11, having on its underside magnetized face 11*a* with the N and S poles formed in diametrically opposed relation, and the lower ring-shaped magnet 12, having on its upperside a magnetized face 12*a* with the N and S poles formed in diametrically opposed relation, are mounted on a turning and supporting shaft 16 of the pickup arm 15 in such a manner that their magnetized faces 11*a* and 12*a* are vertically opposed to each other. Upper ring-shaped magnet 11 is positioned within a cover member 13 with its magnetized underside face 11*a* alone being exposed. The cover member 13 is secured to magnet 11 by means of a screw 14 which has a grip head 14*a* projecting externally to allow easy access thereto from the outside. A push spring 19 is coiled around the part of turning shaft 16 that is positioned within cover member 13, the lower end of spring 19 abutting against a flange 18 of shaft 16 to hold upper ring-shaped magnet 11 at its fixed axial position. If desired, magnet 11 can be turned in the horizontal direction by turning said grip head 14*a*. The upper end of cover member 13 is rotatably fitted in an arm supporting block 17.

As will be also seen, the lower ring-shaped magnet 12 is closely fitted in an externally threaded cylindrical member 30 such that the magnetized face 12*a* of magnet 12 is exposed upwardly. Cylindrical member 30 is threadedly fitted within a rotatable external cylindrical member 21 having an internal thread adapted to engage with the external thread of cylindrical member 30. The rotatable cylindrical member 21 is fitted in a cylindrical supporting structure 24.

Turning shaft 16 is enclosed by a hollow shaft 31 which is secured at its bottom in a suitable way, and which has also formed along its upper part a vertical slot 25 adapted to sungly receive therein an inward protuberance 12*b* of the lower ring-shaped magnet 12.

Cylindrical supporting structure 24 is integrally joined to the mounting base portion 23 of an arm rest rod 22. At base portion 23 is also provided an arm lifter means 32 in close adjacency to the supporting portion of the turning shaft 16. Rotatable cylindrical member 21 is formed around its external surface with a plurality of equidistant vertical indentations 21*a* and with a circumferentially extending supporting groove 21*b* adapted to receive therein a front edge 27*a* of a supporting plate 27 which is centrally secured to arm lifter means 32, thereby to accommodate horizontal turning of cylindrical member 21.

Also in the drawings, numeral 33 designates a main weight carried at the termination of the extension of the pickup arm 15, 34 a sub-weight for adjusting the needle pressure, and 35 a part of the machine body mounting plate.

As aforementioned, the upper ring-shaped magnet 11 of the present invention can be turned either clockwise or counterclockwise by operating the grip head 14*a*. The lower ring-shaped magnet 12 can be axially adjusted by turning the rotatable cylinder 21. As cylinder 21 is supported at a fixed axial position by supporting plate 27 to prevent axial movement, the threaded cylinder 30, in which lower magnet 12 is secured, can be moved vertically along the vertical slot 25 in the hollow shaft 31 in which the inner protuberance 12*b* of magnet 12 is fitted. It will be therefore understood that horizontal turning of the upper magnet causes corresponding angular displacement of the two opposed magnetic poles relative to each other, while horizontal angular adjustment of the cylinder 21 effects axial approach or separation of the two opposed magnetized faces relative to each other.

The distribution pattern of the magnetic flux formed by the respective opposed poles of the two ring-shaped magnets used in the present invention is shown in FIG. 6. FIG. 7 shows a planar view of the opposed relation between the magnetized faces 11*a* and 12*a* of the two magnets 11 and 12.

Now, the manner of displacement of the magnetic poles, that is to say, the manner of variation of repulsion and attraction (variation of turning force), as caused when the magnetized face 11*a* is turned counterclockwise while maintaining the other opposed magnetized face 12*a* stationary under the above-mentioned condition, will be discussed with particular reference to FIG. 8. When the centers of the same-polarity poles of the opposed polarized faces 11*a* and 12*a* are positioned on the horizontal axis $x—x$ in FIG. 8, the repulsive force produced is greatest but, on the other hand, the turning force of the supporting shaft 16 is zero, so that it may be regarded that the maximum value of repulsion resides at the point P attained as the polarized face 11*a* is slightly turned counterclockwise. If polarized face 11*a* is further turned counterclockwise, from the above maximum repulsion point P, the repulsive force is gradually diminished until finally the repulsion and attraction are brought in equilibrium to reduce the turning force to zero at a point approximately 90° distant from point P. Further counterclockwise turning of polarized face 11*a* causes now gradual increase of the attractive force which becomes gratest upon reaching the point $P_1$ (where the turning force becomes highest).

FIG. 9 shows the curve of the above-mentioned turning force variation. This curve conforms very closely to the inside force variation curve shown in FIG. 5.

The present invention utilizes the character of the above-mentioned turning force curve, or more specifically, it utilizes the turn angle of the range most effective for counteracting the inside force. In selecting such optimum turn angle, although the turning force curve bears a close parallel to the inside force curve, there is still needed to take into account various factors such as record radius, arm length, offset angle, tracking angle, etc. For instance, by using a testing record such as a grooveless record, the arm length may be shortened to enlarge the turn angle, as indicated by A in FIG. 9, in conformity to the turn angle of the arm and the incidental inside force characteristics as observed on the testing record, thereby to obtain a turning force closely approximate to the inside force. Such turning force may also be obtained by elongating the arm and thereby reducing the turn angle as indicated by B in the same figure. Thus, in any case, the turn angle is selected by paying due consideration to the various factors such as aforementioned.

In practice, when the end of the needle in the pickup arm is contacted with the sound groove on a record 29, the lower ring-shaped magnet 12 is vertically adjusted by turning the cylinder 21 so as to suitably adjust the distance between the opposed polarized faces 11*a* and 12*a* of the respective magnets 11 and 12, whereby the repulsive force between the magnets can be microadjusted and an optimum needle pressure can be obtained for effectively counteracting the inside force that varies in proportion to the needle pressure.

The upper ring-shaped magnet 11 can be also turned either clockwise or counterclockwise as desired, so that by shifting the polarized face 11*a* of magnet 11 through a suitable angular distance relative to the polarized face 12*a* of the other opposed magnet 12, one can easily determine the optimum reference point for cancellation of the inside force on the turning force variation curve shown in FIG. 5. Further, since the magnet 11 can be turned with the pickup arm 15 as stated before, its polarized face 11*a* is displaced from the above selected reference point by turning pickup arm 15 so that a turning force curve (FIG. 9) with close approximation to the inside force curve (FIG. 5) will be described between the two polarized faces 11*a* and 12*a*, so as to give arm 15, via its supporting shaft 16, a turning force acting oppositely to and counteracting the inside force.

Moreover, since the present invention utilizes a pair of ring-shaped magnets each being magnetized on one face alone and such magnets are fitted in an arm supporting shaft such that the magnetized faces are opposed to each other, there is no fear of any accidental change taking place in the axial distance between the two opposed magnets during any turning movement effected by repulsion or attraction between the magnets. Also, as the turning force developed between magnetized faces 11*a* and 12*a* is transmitted to the arm 15 through its supporting shaft 16 positioned axially of both magnets, such transmission of the turning force can be achieved with no loss at all, thus allowing counteracting of the inside force to perfection.

What is claimed is:

1. A device for counteracting the inside force produced on a pickup arm, secured to a vertically oriented rotatable turning and supporting shaft, during playback of a record, comprising, in combination, a pair of ring-shaped magnets embracing said shaft in axially opposed relation, each of the opposing faces of said magnets being polarized with N and S poles; one magnet being fixed against movement axially of said shaft while being angularly displaceable with said shaft and said pickup arm, and the other magnet being fixed against angular adjustment while being adjustable axially of said shaft; means operable to angularly adjust said one magnet relative to said shaft in the horizontal direction; and means operable to adjust said other magnet axially of said shaft toward and away from said one magnet to adjust the axial distance between said opposed magnet faces.

2. A device for counteracting the inside force produced on a pickup arm, as claimed in claim 1, in which said N and S poles are diametrically opposite each other on the respective faces of the associated magnets.

3. A device for counteracting the inside force produced on a pickup arm, as claimed in claim 1, in which the upper magnet is rotatable with said shaft and angularly adjustable relative thereto, and the lower magnet is fixed against rotation but is adjustable axially of said shaft.

4. A device for counteracting the inside force produced on a pickup arm, as claimed in claim 1, including a cover member having a rim and housing the upper magnet with its polarized face exposed downwardly; a screw extending through the rim of said cover member and engaged with said upper magnet, said screw projecting externally of said rim and having a grip head for angular adjustment of said upper magnet relative to said shaft.

5. A device for counteracting the inside force produced on a pickup arm, as claimed in claim 4, including an externally threaded cylinder fixedly housing the lower magnet with its polarized face exposed upwardly; an internally threaded rotatable cylinder threadedly engaged with said externally threaded cylinder; means restraining rotation of said externally threaded cylinder; and means inhibiting axial movement of said internally threaded cylinder; whereby, upon rotation of said internally threaded cylinder, said externally threaded cylinder and said lower magnet are adjusted axially of said shaft.

6. A device for counteracting the inside force produced on a pickup arm, as claimed in claim 5, including a tubular shaft surrounding said turning and supporting shaft and fixed against rotation; said tubular shaft having an axial groove in its external surface receiving a radially inwardly extending protuberance on the inner periphery of said lower magnet.

7. A device for counteracting the inside force produced on a pickup arm, as claimed in claim 6, including a block supporting said pickup arm; said cover member being mounted in said block for angular adjustment.

8. A device for counteracting the inside force produced on a pickup arm, as claimed in claim 7, including a spring embracing said turning and supporting shaft and engaged between an upper wall of said cover member and a flange on said turning and supporting shaft.

9. A device for counteracting the inside force produced on a pickup arm, as claimed in claim 5, in which said internally threaded rotatable cylinder has a plurality of axially extending circumferentially spaced indentations on its outer periphery, and a circumferentially extending groove on its external periphery; and a fixed supporting plate having an arcuate edge portion engaged in said groove.

* * * * *